United States Patent
Döring

(10) Patent No.: US 10,271,563 B2
(45) Date of Patent: Apr. 30, 2019

(54) PROCESS FOR THE PRODUCTION OF UHT MILK WITH IMPROVED TASTE CHARACTERISTICS

(71) Applicant: DMK Deutsches Milchkontor GmbH, Zeven (DE)

(72) Inventor: Sven-Rainer Döring, Zeven (DE)

(73) Assignee: DMK Deutsches Milchkontor GmbH, Zeven (DE)

( * ) Notice: Subject to any disclaimer, the term of this patent is extended or adjusted under 35 U.S.C. 154(b) by 8 days.

(21) Appl. No.: 15/616,437

(22) Filed: Jun. 7, 2017

(65) Prior Publication Data

US 2017/0354160 A1    Dec. 14, 2017

(30) Foreign Application Priority Data

Jun. 8, 2016  (EP) ..................................... 16173611

(51) Int. Cl.
| | |
|---|---|
| A23C 21/06 | (2006.01) |
| A23C 9/142 | (2006.01) |
| A23L 5/20 | (2016.01) |
| A23C 3/03 | (2006.01) |
| A23C 9/15 | (2006.01) |

(52) U.S. Cl.
CPC ............. *A23C 9/1422* (2013.01); *A23C 3/03* (2013.01); *A23C 9/1425* (2013.01); *A23C 9/1512* (2013.01); *A23L 5/21* (2016.08); *A23C 2210/252* (2013.01); *A23C 2210/254* (2013.01); *A23V 2002/00* (2013.01)

(58) Field of Classification Search
CPC ....... A23C 9/1422; A23C 9/1425; A23C 5/21; A23C 9/1512; A23C 2210/252; A23C 2210/254; A23C 2210/256
USPC ................................ 426/491, 580, 583, 657
See application file for complete search history.

(56) References Cited

U.S. PATENT DOCUMENTS 4,497,836 A *   2/1985  Marquardt et al.
2017/0105424 A1*  4/2017  Kallioinen et al.

FOREIGN PATENT DOCUMENTS

| WO | 96/36238 A1 | 11/1996 |
|---|---|---|
| WO | 2008/055592 A1 | 5/2008 |

* cited by examiner

*Primary Examiner* — Helen F Heggestad
(74) *Attorney, Agent, or Firm* — Dilworth & Barrese, LLP

(57) ABSTRACT

Suggested is a process for the production of a UHT milk with improved taste characteristics, comprising the following steps:
(a) providing a raw milk;
(b) separating the raw milk into a skimmed milk fraction and a cream fraction;
(c) microfiltration or diafiltration of the skimmed milk fraction, obtaining a casein-containing retentate R1 and a fine whey as permeate P1;
(d) ultrafiltration of the fine whey of step (c), obtaining a permeate P2 that is rich in lactose and minerals, and a protein-rich retentate R2;
(e) mixing the cream fraction, the retentate R1 containing the casein and the permeate P2 containing the lactose and minerals, obtaining a mixed fraction M1;
(f) ultra-high temperature treatment of the mixed fraction M1 of step (e);
(g) pasteurization of the protein-rich retentate R2 obtained in step (d); and
(h) mixing the ultra-heat treated fraction M1 of step (f) with the pasteurized retentate R2 of step (g), obtaining the target product.

10 Claims, 1 Drawing Sheet

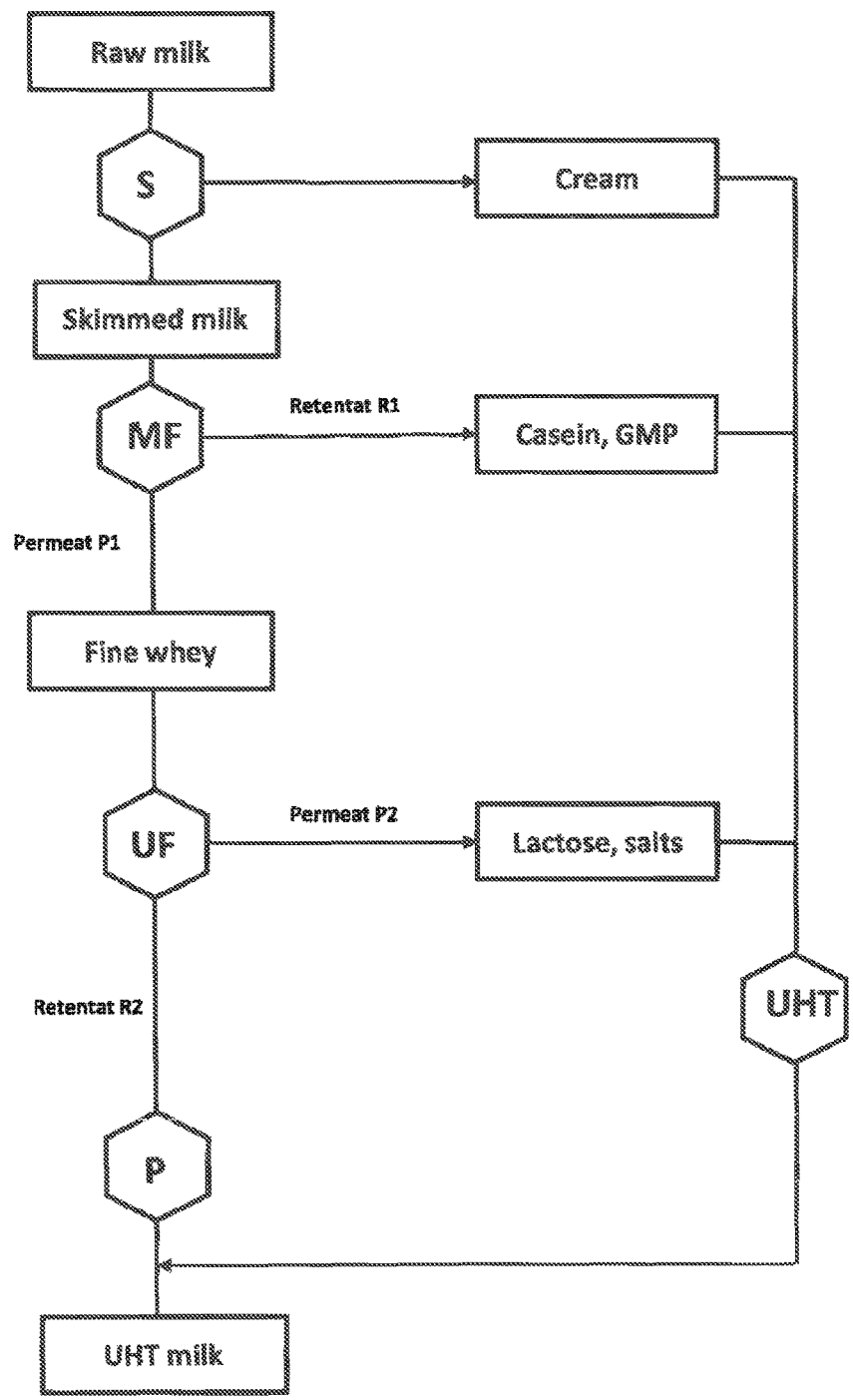

PROCESS FOR THE PRODUCTION OF UHT MILK WITH IMPROVED TASTE CHARACTERISTICS

FIELD OF THE INVENTION

The invention is in the field of dairy products and relates to a process for the production of an ultra-heat treated milk with a long shelf life and with improved taste characteristics.

STATE OF THE ART

The term UHT milk is understood by the skilled person as being a milk which has been stabilized or preserved by ultra-high temperature treatment for an extended period of time. To this end, milk is typically heated to temperatures above 100° C. in suitable heat exchangers for a period of a few seconds, destroying all germs in the process. This is followed by aseptic filling into corresponding sterile vessels. Such processes are sufficiently known from the state of the art such as, for example, U.S. Pat. No. 4,921,717 (MILK MARKETING BOARD).

UHT milk is characterised by a particularly long shelf life, however, a slightly unpleasant taste ("taste of boiled milk") is formed as a result of the high temperature strain during pasteurisation, as a Maillard reaction is performed between lactose and the delicate whey proteins. The inferior taste quality of the UHT milk conveys to the consumer the impression of a lower-quality product, in comparison to which a "fresh" milk—despite of its short storability—is always preferred.

In the past, there have been many attempts to overcome the problem of the Maillard reaction by means of process-related means. For example, DE 10 2005 007557 A1 (TUCHENHAGEN DAIRY) suggests to perform pasteurisation in a tube bundle reactor with interposed bypasses for heating and cooling. In practice, however, this process proves to be technically complex, and it may reduce the scope of the Maillard reactions at best, but not avoid them completely.

EP 290206 B1 (DUPONT) suggests another way: here, the shelf life of raw milk is improved by adding a lipidacyltransferase. Adding foreign enzymes to milk, particularly genetically modified enzymes, is rejected by the consumer, and is, therefore, economically not reasonable.

For this reason, it remains an important goal of the dairy industry to be able to offer UHT milk having a long storability and improved taste characteristics.

The object of the following invention was therefore to provide a process, by means of which a UHT milk can be produced at a possibly low technical complexity, which has a long storability but whose taste is barely distinguishable from raw milk.

DESCRIPTION OF THE INVENTION

The invention relates to a process for the production of UHT milk with improved taste characteristics, comprising the following steps:
(a) Providing a raw milk;
(b) Separating the raw milk into a skimmed milk fraction and a cream fraction;
(c) Microfiltration of the skimmed milk fraction, obtaining a casein-containing retentate R1 and a fine whey as permeate P1,
(d) Ultrafiltration of the fine whey of step (c), obtaining a permeate P2 that is rich in lactose and minerals, and a protein-rich retentate R2;
(e) Pasteurization of the retentate R2;
(f) Mixing the cream fraction, the retentate R1 and the permeate P2, obtaining a mixed fraction M1;
(g) Ultra-high temperature treatment of the mixed fraction M1 of step (f); and
(h) mixing the ultra-heat treated fraction M1 of step (g) with the pasteurized retentate R2 of step (e), obtaining the target product.

The process of the invention can be summarized as follows:

In the first step, cream is separated from the raw milk in a separator, which is stored as a separate fraction for further use. The skimmed milk such obtained is subjected to microfiltration, where the casein is separated by means of the retentate; in addition, this fraction also contains the major part of the germs. The permeate represents a fine whey which contains lactose and minerals in addition to the temperature-sensitive whey proteins. This fraction is subjected to ultrafiltration, in the process of which the lactose and the minerals are separated as permeate. Now, the retentate only contains the whey proteins. The cream, the casein fraction and the lactose/mineral fraction contain only temperature-resistant components and may be subjected to a UHT treatment after combining them without that Maillard reactions are caused, because the fractions are practically free of proteins. Finally, the UHT fraction is combined with the UF retentate, after pasteurization of the UF retentate. Now, the resulting UHT milk contains all components of the raw milk, however, as a result of the pasteurisation which is adjusted to temperature stability no undesired reaction products are formed, and the taste quality has notably improved.

A further benefit is in that the UHT milk can be composed from the fractions—just like a construction set—in order to take into account different taste requirements as well as nutritional-physiological requirements (e.g., with respect to the protein composition or the fat and lactose content) at the same time. Ultimately, the UHT milk may also be transferred to a corresponding powder.

BRIEF DESCRIPTION OF THE DRAWING

The present invention will be described in greater detail with reference to the accompanying drawing in which FIG. 1 is a flow chart illustrating the method according to the present invention.

Separation

Separation is understood as being the separation of the cream up to a fat content of about 4% by weight, and the removal of solids. The process can be performed under hot conditions at a temperature in the range from about 20 to about 60° C., or under cold conditions at a temperature from about 8 to about 18° C.

In the process according to the invention it is advantageous to perform the separation cold. In doing so, it is advantageous if the temperature of the cold condition of the raw milk is adjusted to a value that is optimal for separation by means of heat exchange using a heat carrier medium. Usually, the raw milk is available in a cooled condition, the temperature of which does not correspond to the value where cold separation can be performed most effectively and most gently with respect to the milk fat (cream). It is, therefore, adapted to the value that is optimal for separation by means of heat exchange. The exchanged cold temperature from the process may be made available to other processes that are carried out in a dairy, particularly by a so-called heat exchanger. For example, the temperature of the cooled raw milk does not exceed 6° C., while the optimum temperature for cold separation is in the range from 8 to 18° C. and particularly from 8 to 12° C. In this case, heat exchange is performed by heating the raw milk, so that the temperature of the cold condition thereof is increased to a value within this range. In dairies there usually is excess heat. Therefore, low-temperature water obtained in dairy processes can be used as a heat carrier medium for heating. Said low-temperature water is supplied to the heat exchange process at a temperature which is, for example, in the range of 35° C., and is then cooled down by heat exchange to a temperature which is, for example, in the range from 11 to 15° C. In doing so, the process of the invention provides an important cold source for dairy processes.

If the separation is performed hot, the preferred temperature is in the range from about 35 to about 65° C. and particularly from about 45 to about 55° C.

The separation of solids and the skimming of a fat content of about 4% by weight is usually carried out in a downstream component, preferably a separator. Said components are adequately known from the state of the art. Separators of the company GEA Westfalia Separator GmbH, which allow the joint or single separation of solids (http://www.westfalia-separator.com/de/anwendungen/molkereitechnik/milch-molke.html), are widely used in the dairy industry. Preferred cold milk separators are marketed by the manufacturer under the name "Procool". Corresponding components have also been disclosed, for example, in DE 10036085 C1 and DE 10361526 B3 (Westfalia) and are perfectly known to one skilled in the art. Therefore, no explanations are needed on how to carry out these process steps, as they are understood to be part of the general specialist knowledge.

Microfiltration or Diafiltration

Membrane separation processes include microfiltration or diafiltration. The essential difference to ultrafiltration and nanofiltration is in the different pore sizes and in the different membrane structure as well as in the materials and filter materials involved. Filtration through membranes having a pore size <0.1 μm is usually referred to as nanofiltration or ultrafiltration, while filtration at pore sizes >0.1 μm, specifically from about 0.1 to 1 μm, is usually referred to as microfiltration or diafiltration. In both cases this concerns purely physical, i.e., mechanical membrane separation methods which apply the principle of mechanical size exclusion: all particles in the fluids which are larger than the membrane pores are retained by the membrane. The driving force in both separation methods is the differential pressure between the inlet and the outlet of the filter area, which is between 0.1 and 10 bar. Depending on the area of application, the filter area material may consist of stainless steel, synthetic material, ceramics or textile fabric. Filter elements appear in different forms: candle filters, flat membranes, spiral coil modules, bag filters and hollow fibre modules, all of which are, in principle, suitable within the meaning of the present invention.

Both microfiltration and diafiltration of the skimmed milk may be performed "hot" or "cold", i.e., within the temperature range from about 10 to about 60° C. However, it is preferred to work at temperatures in the lower range from about 10 to about 20° C.

Ultrafiltration

The fine whey obtained as a permeate as a result of microfiltration is subjected to ultrafiltration for further separation. The two filtration methods differ with respect to their degree of separation. If the cut-off limit (or also "Cut-off") is 100 nm or more, one is referring to microfiltration. If the cut-off limit is in the range between 2-100 nm, this is referred to as ultrafiltration.

The exclusion limits of ultrafiltration membranes are also indicated in form of the NMWC (Nominal Molecular Weight Cut-Off, also referred to as MWCO, Molecular Weight Cut Off, unit: Dalton). It is defined as the minimal molecular mass of globular molecules, 90% of which are retained by the membrane. In practice, the NMWC should be at least 20% lower than the molecular mass of the molecule to be separated. Further qualitative statements about filtration can be made by means of the flux (water value) (transmembrane flux or passage rage). Ideally, it is proportional to the transmembrane pressure and reciprocal to the membrane resistance. These sizes are determined both by the characteristics of the membrane used and by concentration polarisation and possibly occurring fouling. The passage rate relates to 1 $m^2$ of membrane area. Its unit is $l/(m^2h\ bar)$.

Membranes which have a pore size in the range from about 1,000 to about 50,000 and preferably from about 5,000 to about 25,000 Dalton have proved to be particularly suitable for ultrafiltration.

The material of the filter area—both in ultrafiltration and also in nanofiltration—may represent stainless steel, polymer materials, ceramics, aluminium oxide or textile fabric. Filter elements appear in different forms: candle filters, flat membranes, spiral coil membranes, bag filters and hollow fibre modules, all of which are, in principle, suitable within the meaning of the present invention. However, spiral coil membranes made of polymer materials, or candle filters made of ceramics or aluminium oxide are preferably used, where the first form of embodiment has proved to be particularly preferred for ultrafiltration and the second one for nanofiltration.

Ultrafiltration within the meaning of the present invention may be performed "hot" or "cold", i.e., within the temperature range from about 10 to about 60° C. However, it is preferred to work at temperatures in the lower range from about 10 to about 20° C.

UHT Treatment

As the mixed fraction made of cream, casein, lactose and minerals is free of proteins it can easily be subjected to drastic temperature conditions, under which all germs which had been introduced by the retentate during microfiltration are killed. For example, this can be performed in tube reactors or in flow reactors, where flow times of 1 to 5 seconds and temperatures between 100 and 145° C. are typical. However, two processes are preferred which are referred to as DSI or infusion, respectively.

Direct Steam Injection (DSI)

In a first alternative embodiment, the product may also be pasteurised by Direct Steam Injection (DSI). This has the advantage that the slow passing of a range of temperature in which mesophilic and thermophilic spores find optimum growth conditions is significantly reduced by ultra-fast heating. This is achieved by a direct injection of hot or even super-hot steam which may have a temperature from 100 to about 250° C. This is commonly performed by means of nozzles, which either immerse directly into the product or are incorporated in a discharge of the heat exchanger. The principle of DSI consists in guiding a pressurized steam jet into a nozzle chamber, which then releases its energy through a perforated tube ("Radial Steam Jet Diffuser") into the liquid product which is to be heated. The high-pressure stream creates a radial heat exchange field which is expanding at a high velocity, by means of which a uniform heating of the product is achieved at a very short time.

The object is to heat up the dairy product to a precise temperature within a very short time, preferably from 1 to about 5 seconds, particularly from 1 to 2 seconds. To this end, it is necessary to inject a possibly precise amount of steam into the product at a high velocity. If the amount of steam is controlled by a pressure reducing valve, the velocity of the steam typically falls below the velocity of sound, as a result of which the product does not heat up fast enough. To prevent this, the steam within the meaning of the process of the invention is preferably injected under what is referred to as "choke-flow" conditions, because this allows to inject steam directly into the product to be heated also at ultrasonic velocity. This is understood as being the phenomenon by which steam velocity is increased by creating a pressure difference by means of a particular nozzle. Corresponding components are commercially available, for example, from the company ProSonics.

DSI does not require any pre-heating of the raw material, i.e., the product of dialysis can immediately be used. However, the smaller the temperature differences, the more precise the temperature control.

Infusion

In a second alternative embodiment, the product can also be pasteurised by means of (steam) infusion. This method has been known since the 1960ies. In principle, heating can be performed in two steps, in the process of which the material to be heated is injected into a pressure chamber filled with hot steam, and heating or pasteurisation is preformed on the falling path of the droplets. However, the significance of the so-called PDX process has increased since the year 2000. Here, the material to be heated is vaporised and suddenly heated in a stream of ultra-hot steam. The stream of steam that is moving forward at ultrasonic velocity homogeneously distributes the product droplets, so that a multi-phase stream is created, while heating is very gently taking place only at the interfacial areas of the droplets. In this manner, a condensation of the droplets is effected at the same time. In doing so, the steam may have a temperature from about 100 to about 250° C. and particularly from about 120 to about 150° C., infusion requires a period of typically 1 to 5 and particularly about 2 to 3 seconds.

In a further preferred embodiment, infusion heating is performed such that product and steam are alternately sprayed into a reactor via concentric ring nozzles, so that a steam pressure gradient is created from the inside out. As a result, the droplets are kept off the wall and will not burn.

Pasteurisation

The second retentate which contains the proteins must be subjected to pasteurisation, as it is still "raw" and has not been heated yet. This is preferably performed in heat exchangers, in which case, specifically, plate heat exchangers have proved to be particularly suitable. There is a temperature gradient at the heat exchangers, which, however, is selected such that the product is heated to a temperature from about 70 to 80° C. and particularly from about 72 to 74° C. for a residence time of a minimum of 20 and a maximum of 60 seconds, preferably about 30 seconds.

Drying

In a last optional process step, the UHT milk, which was obtained by mixing the pasteurised protein fraction with the UHT heated mixed fraction of cream, casein, lactose and minerals, can be dried. Spray drying is preferably used here, with the temperature in the inlet typically ranging from about 180 to about 260° C. and from about 80 to about 105° C. at the outlet. Therefore, the UHT milk does not require any cooling before entering the spray tower. Here, temperatures from 60 to 70° C. are even preferred, as this decreases the risk of denaturing the proteins. This also renders a higher performance of the drying device, as the hot air does not have to be used for heating the good to be dried, but is exclusively available for dehydration. Alternatively, the products may also be dehydrated by freeze drying.

Further additives may be added to the UHT milk before, but preferably after spraying such as, for example, lactoferrin, lecithins, vitamins or food emulsifiers [EP 1314367 A1, NESTLE] and the like.

EXAMPLES

Example 1

Solids were removed from 330 kg of pre-cooled raw milk in a separator at 8° C., which was then skimmed. In this process, 300 kg of skimmed milk and 30 kg of cream were obtained, which was subsequently pasteurised by ultra-high temperature treatment and further processed.

The skimmed milk was heated to about 55° C. and then supplied to a microfiltration unit, into which it was placed together with 100 kg diafiltration water through a membrane with an average pore size of 0.1 μm. 66 kg of retentate were obtained, which was 90% casein and also contained the complete amount of glycomacropeptides (GMP) and germs.

333 kg of fine whey were obtained as permeate, which had a dry matter content of about 5.5% by weight. The permeate was introduced into an ultrafiltration unit and applied through a membrane with an average pore size of 1,500 nm. 300 kg of permeate were obtained, which contained the lactose and the minerals, as well as 33 kg of permeate, in which the proteins appeared in concentrated form.

The cream fraction and the first retentate and the second permeate were combined. As this fraction practically exclusively consisted of lipids, casein, lactose and minerals and did not contain any proteins, it could be subjected to a UHT treatment (3 seconds, 115° C.) without that a Maillard reaction was performed. In addition, these conditions were sufficient to destroy all germs contained in the first retentate.

The protein fraction, i.e., the second retentate, was pasteurised under standard conditions (25 seconds, 74° C.). As this fraction did not contain any lactose, also in this case no Maillard reaction was performed.

Finally, both fractions were mixed. A UHT milk with a high storage stability was obtained whose taste was barely distinguishable from raw milk.

Example 2

The UHT milk of example 1 was applied to a spray tower and processed to a dry powder at an inlet temperature of 150° C. and an outlet temperature of 105° C., which still had a residual moisture of 2% by weight.

The invention claimed is:

1. A process for the production of a UHT milk with improved taste characteristics, comprising the following steps:
   (a) providing a raw milk;
   (b) separating the raw milk into a skimmed milk fraction and a cream fraction;
   (c) microfiltration or diafiltration of the skimmed milk fraction, obtaining a casein-containing retentate R1 and a fine whey as permeate P1;

(d) ultrafiltration of the fine whey of step (c), obtaining a permeate P2 that is rich in lactose and minerals, and a protein-rich retentate R2;

(e) mixing the cream fraction, the retentate R1 containing the casein and the permeate P2 containing the lactose and minerals, obtaining a mixed fraction M1;

(f) ultra-high temperature treatment of the mixed fraction M1 of step; (e);

(g) pasteurization of the protein-rich retentate R2 obtained in step (d); and (h) mixing the ultra-heat treated fraction M1 of step (f) with the pasteurized retentate R2 of step (g), obtaining the target product.

2. The process of claim 1, wherein separation is performed under hot conditions at a temperature in the range from about 20 to about 60° C.

3. The process of claim 1, wherein separation is performed under cold conditions at a temperature in the range from about 8 to about 18° C.

4. The process of claim 1, wherein microfiltration or diafiltration is performed with a membrane having an average pore size from about 0.1 to about 1 μm.

5. The process of claim 1, wherein microfiltration or diafiltration is performed at a temperature in the range from about 10 to about 60° C.

6. The process of claim 1, wherein ultrafiltration is performed with a membrane having an average pore size from about 1,000 to about 5,000 nm.

7. The process of claim 1, wherein ultrafiltration is performed at a temperature in the range from about 10 to about 60° C.

8. The process of claim 1, wherein ultra-high temperature treatment is performed for a period from about 1 to about 10 seconds at a temperature in the range from about 100 to about 145° C.

9. The process of claim 1, wherein pasteurisation is performed for a period from about 10 to about 20 seconds at a temperature in the range from about 70 to about 75° C.

10. The process of claim 1, wherein the UHT milk with improved taste characteristics is converted to a dry powder after mixing in step (h).

\* \* \* \* \*